Feb. 26, 1957 A. M. STONE 2,782,655
PROTECTIVE MEANS FOR HIGH SPEED ROTATING SYSTEM
Filed Nov. 26, 1954
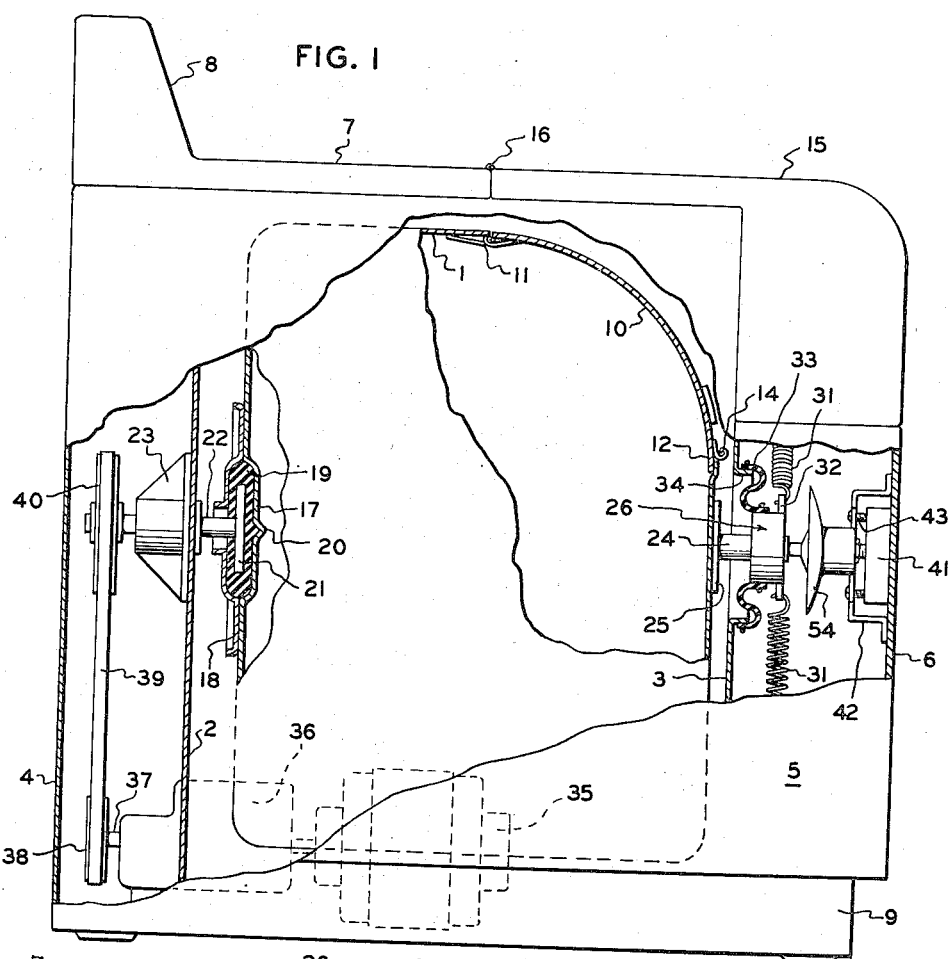
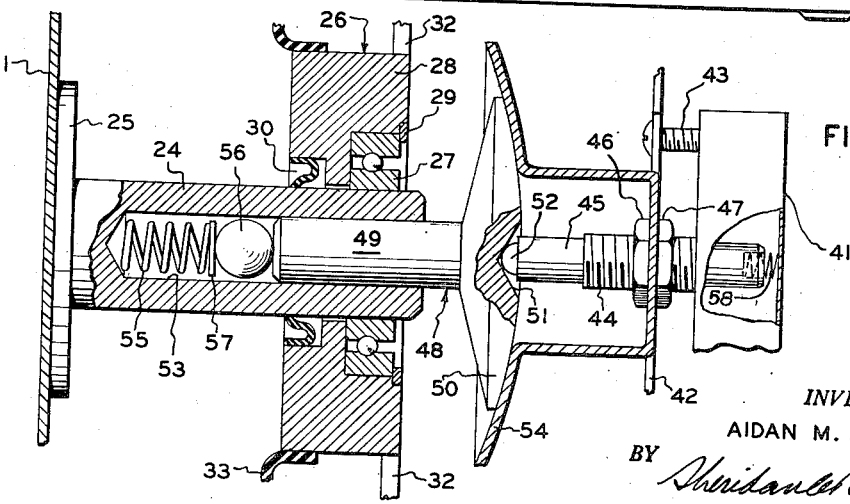
INVENTOR.
AIDAN M. STONE
BY
HIS ATTORNEY United States Patent Office 2,782,655
Patented Feb. 26, 1957

2,782,655
PROTECTIVE MEANS FOR HIGH SPEED ROTATING SYSTEM

Aidan M. Stone, Louisville, Ky., assignor to General Electric Company, a corporation of New York Application November 26, 1954, Serial No. 471,465

5 Claims. (Cl. 74—573)

This invention relates generally to high-speed rotating systems such as centrifugal laundry extractors and the like, and more particularly to a vibration sensing device for detecting excessive excursions of the systems from the normal rotational axis.

While high-speed rotating systems operate smoothly when in perfect static and dynamic balance, an unbalance can result in destructive vibrations, depending upon the weight of any unbalanced loads, the position of each such unbalanced load with respect to the rotational axis, and the rotational velocity. In some applications, such as laundry centrifugal extractors, conditions of unbalance must be expected, since distribution of the wet laundry articles is more or less fortuitous. If the unbalance is sufficient to produce undesirable gyrations of the clothes basket and severe vibration of the entire machine, immediate corrective action is required. For example, the machine should be shut down, or automatic balancing means should be brought into effect.

Correspondingly, a primary object of my invention is to provide a control device for detecting excursions of a rotating system exceeding a predetermined amount.

A further object of this invention is to provide actuating means for an electrical switch, or similar control device, capable of accurately sensing the excursion of a rotating mass from its normal rotational axis, without variation in results due to end-play effects and manufacturing tolerances. It is also an object to provide a construction including an adjustable control device whereby the excursion necessary for actuation thereof can be preselected.

A further object of this invention is to isolate the control device from the rotating system by means of a construction which minimizes wear and features long operating life. It is also an object of this invention to provide a highly reliable vibration detecting system at a low manufacturing cost.

Still a further object of this invention is to construct a vibration sensing device for detecting excursions of a rotating system exceeding a predetermined amplitude and functioning to continuously actuate a control device as long as such amplitude is exceeded.

In carrying out my invention in one form, I provide a control device actuated by transverse movement of the shaft of a rotating system. An actuator carried by the shaft, and axially movable with respect thereto, is biased outwardly away from the shaft into engagement with a positioning device. Thus the axial position of the actuator remains fixed, while permitting transverse movement. The actuator, through an inclined wall depression therein, receives a plunger of the control device. Thereby, the control device plunger is moved axially responsive to transverse displacement of the shaft in any direction.

The features of my invention which I believe to be novel are set forth with particularity in the appended claims. The invention itself, however, both as to its organization and method of operation, together with further objects and advantages thereof, may best be understood by reference to the following description taken in connection with the accompanying drawing, in which Fig. 1 is a side elevation, partially sectionalized and with certain surfaces broken away to illustrate detail, of a laundry appliance embodying my invention; and Fig. 2 is an enlarged cross-sectional view of certain components, with certain surfaces broken away to illustrate details.

Referring to the drawing, this invention is illustrated as embodied in a laundry appliance of the type having a clothes basket 1 rotatable on a generally horizontal axis and inclosed within an appropriate tub structure of which only the back wall 2 and front wall 3 are shown in Fig. 1. In the usual manner, an outer enclosing cabinet is provided having a back wall 4, side walls 5, a front wall 6, and a top 7. The top of the machine may include the usual back splash panel 8 as desired. The entire machine may be supported on a base structure 9 in a manner now well understood in the art.

While it is not essential to the practice of this invention, I have shown the machine in the illustrated embodiment as a top-loading machine, although the clothes basket rotates on a horizontal axis. This may be accomplished by providing a hinged door 10 on basket 1, with a hinge structure 11 permitting door 10 to swing inwardly. The free edge 12 of the door is adapted to overlap the front wall of the basket so that when basket 1 is rotated at high speed, there is no danger of door 10 moving outwardly. The door may be retained in its closed position by any suitable means, such as a spring-clip 14. The outer cabinet structure is provided with an opening door 15 which is hinged at 16 to permit access into the machine. Thus, to obtain access to the interior of the basket, cabinet door 15 is raised and door 10 of the basket is pressed inwardly.

The use of such a top loading horizontal axis construction permits support of the rotatable basket at both ends. As illustrated by Fig. 1, the rear wall of the basket is formed with a centrally located indentation 17, which in cooperation with an oppositely indented reinforcing plate 18 defines a recess into which a quantity of elastomeric material 19 may be placed. This elastomeric or rubber-like material may be keyed to the rear wall of the basket by providing it with a transverse indented rib 20. Bonded within this elastomeric material is a drive disc 21 integral with a drive shaft 22. Shaft 22 is journaled in rear wall 2 of the tub in an appropriately reinforced bearing structure 23. It will be understood, however, that this arrangement for supporting the rear wall of the basket is not my invention but rather is the invention of William R. Buechler, being described in detail and claimed in his copending application S. N. 590,036 filed June 7, 1956 and assigned to the assignee of the present invention.

The front end of the basket is supported by a projecting stub shaft 24 secured to the front wall of the basket by means of a reinforcing plate 25. Stub shaft 24 is journaled in a bearing and seal structure assembly 26, which, as shown in detail in Fig. 2, includes an appropriate anti-friction bearing 27 secured within a recess in a bearing block 28 by means of a retaining ring 29. The bearing block 28 may be also provided with a recess at its opposite end to receive an appropriate seal 30. The entire bearing assembly 26 is resiliently suspended from the cabinet of the machine by means of a plurality of springs 31 secured to projecting ears 32 on the bearing block. Preferably, three or more such suspension springs are employed equiangularly spaced to support adequately the front bearing assembly. A liquid seal with the bearing assembly may be completed by means of a flexible boot 33 secured to a flanged aperture 34 in the front wall of the tub and to bearing block 28.

With the construction as thus far described, it is seen that the rotatable basket is supported at both ends, with the back end resiliently supported for pivotal movement in the elastic compound 19, while the front end is resiliently supported on a plurality of springs or equivalent members. With such a construction, any excursion of the basket during high-speed rotation tends to be about a fixed node located at the intersection of the back wall of the basket and the axis of drive shaft 22. However, it is equally within the teaching of this invention to employ a resilient suspension for the drive shaft 22 whereby the excursion of the basket will be in a more or less cylindrical pattern; or in other words as a fixed node system of infinite radius.

A power drive for basket 1 may be provided by any of the well-known drive mechanisms, consisting for example of a motor 35 and a transmission unit 36 having an output shaft 37 to which is secured a drive pulley 38. Pulley 38 is connected by a belt 39 to a driving pulley 40 keyed to basket shaft 22. This drive mechanism is of the type which provides a low-speed rotation of basket 1 to cause laundry articles to tumble and be agitated within a washing solution contained within the enclosing tub; or the transmission may be shifted to provide high-speed rotation of basket 1 for centrifugal extraction of the liquid from the laundry articles contained within the basket. Since a number of such drive mechanisms are well known in the art, the details thereof have not been illustrated herein.

Whenever the transmission is shifted from the relatively low tumbling speed to the centrifugal extraction speed the articles tend to distribute themselves against the inner periheral wall of the rotating basket. However, this distribution is more or less random, so that conditions of unbalance must be expected. With the construction of the illustrated embodiment, any such unbalance will tend to cause the axis of stub-shaft 24 on the front wall of the basket to describe or generate a circular path with a fixed node in the plane of the rear basket wall. This motion of stub-shaft 24 is employed by a means now to be described for actuation of a suitable control device such as an electrical switch 41.

Control device 41 preferably is mounted adjustably to a supporting bracket 42 which is welded or otherwise secured to the front wall of the outer cabinet. For example, the switch may be tapped to receive one or more adjusting screws 43 extending through mounting bracket 42. Alternatively, or in addition, the mounting bracket is centrally apertured to receive the threaded sleeve 44 for a switch actuating plunger 45. Thus, sleeve 44 supports switch 41 in the desired fixed position by employing a pair of lock nuts 46 and 47 on opposite sides of brackets 42.

Plunger 45 of the switch is arranged to be operated by means of an actuator 48 comprising a shaft portion 49 and a disc portion 50. A spring 58 positioned between the outer end of the plunger 45 and the back wall of the switch casing biases the plunger against the disc 50 of the actuator, and centrally located in disc 50 of the actuator and facing the switch plunger is an inclined wall recess 51 cooperatively associated with a rounded end 52 on plunger 45. Preferably, although not necessarily, the inclined wall recess is conical to provide a linear movement of plunger 45 responsive to transverse movement of the actuator. The shaft portion 49 of the actuator is of an appropriate diameter to fit slidably within a counterbore 53 in stub-shaft 24. In practice it is found that an actuator formed from nylon or similar material is desirable when used in conjunction with a conventional steel shaft 24 and steel plunger 45 of the switch.

To assure maximum predictability in operation of the control device responsive to transverse movements of shaft 24, it is, of course, necessary to control accurately the axial position of actuator 48. In accordance with this invention this is accomplished by employing a fixed positioning device or cup 54 forming a part of the supporting bracket 42, as clearly shown in the drawing. Actuator 48 is biased constantly into engagement with the positioning cup by means of a compression spring 55 acting within the counterbore in stub-shaft 24 against an anti-friction ball 56. To provide proper bearing surfaces, a bearing plate or disc 57 is desirable between spring 55 and ball 56. With such a construction, shaft 24, rotating with basket 21 results in negligible rotation to actuator 48, and hence there is relatively little wear on plunger 45 of the control device. In any event, rotation of the actuator does not affect operation of the control device.

It may be noticed, particularly in connection with Fig. 2, that the face of actuator 48 in contact with cup 54 is of arcuate configuration, forming a portion of the surface of a sphere. The radius of this sphere is the distance from the fixed node in the plane of the rear wall of the basket to the surface of positioning cup 54. If a system were employed having a different fixed node, for example one of infinite radius, the shape of the positioning cup and the mating face of the actuator would be changed accordingly.

With this construction, the axial position of actuator 48 remains constant throughout rotation and gyration of stub-shaft 24 of the basket. Thus, the axial position of control device 41 can be selected with the system at rest and with plunger 45 centered in the inclined wall recess 51. Thereafter, when the machine is in operation, any gyration of the basket will result in a corresponding transverse movement of stub-shaft 24 along with actuator 48. The control device, of course, remains stationary since it is secured to the fixed supporting bracket 42. However, by virtue of the inclined wall recess 51, transverse movement of the actuator results in axial movement of plunger 45, thereby providing actuation of a switch or other suitable control device.

While I have not shown any particular arrangement of the control device in cooperation with the machine, it will be understood that such a control device could be employed to terminate or alter operation of the machine, to supply a signal by which automatic balancing would be provided, or to perform any other desired control function related to operation of the machine with an unbalanced load.

In operation as a laundry appliance, it will be understood that the clothes basket receives the articles to be washed, while the outer enclosing tub is supplied with a liquid washing detergent. Upon rotation of the basket at a relatively slow speed, the washing action is provided in the usual manner by lifting the clothes with appropriate tumbling ribs (not shown) to a point near the top of the basket whereupon they fall across the diameter of the basket into the liquid detergent. Upon conclusion of the washing action, the basket is rotated at a relatively high speed to extract centrifugally liquid therefrom. It is during the centrifugal extraction, of course, that the undesirable vibrations and gyrations of the basket may take place. It is, of course, common practice to employ a basket diameter in the range from one and one-half to three feet in size. With rotational speeds of several hundred R. P. M. necessary for proper centrifugal extraction, destructive vibrations can occur under some conditions of unbalance. The construction as disclosed and claimed herein permits pre-selection of the permissible excursions of the rotating member with actuation of the control device whenever excursion exceeding this predetermined displacement occurs. Furthermore, and in contrast to previously employed devices of this general type, the control device is not rapidly actuated between on and off, responsive to gyrations of the basket; but on the other hand is continuously actuated as stub-shaft 24 gyrates about its normal rotational axis.

While the present invention has been described by reference to a particular embodiment thereof, it is to be understood that numerous modifications may be made by those skilled in the art without actually departing from the invention. I, therefore, aim in the appended claims to cover all such equivalent variations as come within the true spirit and scope of the invention.

What I claim as new and desire to secure by Letters Patent of the United States is:

1. In a rotating system subject to vibration from an unbalanced rotating mass, means detecting displacement of the rotating system from its normal rotational axis comprising, a shaft for the rotating system, an actuator carried by an end of said shaft and axially movable with respect thereto, means biasing said actuator outwardly away from said shaft end, a positioning device receiving said actuator to limit the axial movement thereof while permitting transverse movement responsive to gyrations and vibrations of said shaft, means defining an inclined wall depression in said actuator in a face thereof opposite said shaft, and a control device having an actuating plunger biased into cooperative engagement with said actuator within said depression, whereby transverse movement of said actuator results in axial movement of said plunger.

2. In a rotating system including a rotating mass subject to conditions of unbalance, means detecting displacement of the rotating system from a normal rotational axis comprising, a shaft for the rotating system, a control actuator having a projecting portion cooperatively engaged with said shaft and axially movable with respect thereto, a fixed positioning member for said actuator axially displaced from the end of said shaft, a face portion on said actuator engageable with said positioning member and slidable laterally with respect thereto, means biasing the face portion of said actuator axially into continual engagement with said positioning member, means defining a depression centrally in said face portion, and a control device having a plunger resiliently biased into engagement in the central depression in said actuator.

3. In a rotating system subject to vibration from an unbalanced mass forming a part of the rotating system, means detecting displacement of the rotating system from its normal rotational axis comprising, a shaft projecting axially from the rotating system, a control actuator having a projecting portion cooperatively engaged with said shaft and axially movable with respect thereto, a fixed positioning member for said actuator axially displaced from the end of said shaft, a face portion on said actuator engageable with said positioning member and slidable laterally with respect thereto, said positioning member thereby establishing the axial position of said actuator, means biasing said actuator into continual engagement with said positioning member, means defining a centrally located inclined wall depression in the face portion of said actuator, and a control device including a plunger resiliently biased into engagement into the central depression in said actuator.

4. In a rotating system subject to vibration from an unbalanced rotating mass, means detecting lateral excursion from rotational axis comprising, a shaft for the rotating mass, said shaft having a hollow end portion, a switch having a plunger mounted in generally coaxial relationship with said shaft, a switch actuator having a face portion with a central inclined wall depression adapted to receive the end of said switch plunger and a projecting portion receivable within the hollow end of said shaft, a stationary position cup mating with the face portion of said actuator to prevent axial movement of the actuator while permitting free lateral movement thereof, and resilient means within the hollow end of said shaft biasing said actuator constantly into engagement with said positioning cup.

5. In a rotating system including an unbalanced rotating mass and having supporting means defining a fixed node for the rotating system, means detecting displacement of the rotating system from its normal rotational axis comprising, a shaft projecting axially from the rotating system to a point displaced from said fixed node, a control actuator carried by said shaft and projecting axially therefrom, said actuator being axially movable with respect to said shaft, a fixed positioning member for said actuator axially displaced from the end of said shaft, a face portion on said actuator engaging said positioning member and permitting lateral movement with respect thereto, means biasing said actuator axially into engagement with said positioning member, means defining an inclined wall depression centrally in said actuator, and a control device having a plunger in axial alignment with said shaft and resiliently biased into engagement in the central depression in said actuator.

References Cited in the file of this patent
UNITED STATES PATENTS

| | | |
|---|---|---|
| 1,600,249 | Sando | Sept. 21, 1926 |
| 2,441,157 | Kissel | May 11, 1948 |